3,580,899
POLYMERIZATION OF ISOPRENE
Jean-Marie Massoubre, Clermont-Ferrand, France, assignor to Compagnie Generale des Etablissements Michelin, raison sociale Michelin & Cie, Clermont-Ferrand, Puy-de-Dome, France
No Drawing. Filed May 10, 1967, Ser. No. 637,327
Claims priority, application France, May 16, 1966, 1,856; Feb. 10, 1967, 94,608
Int. Cl. C08d *3/10*
U.S. Cl. 260—94.3                            7 Claims

ABSTRACT OF THE DISCLOSURE

A polymerization catalyst comprising a mixture of (1) a hydrocarbon solution of a complex of a diaryl ether, such as diphenyl ether, and a tetravalent titanium salt, such as titanium tetrachloride, and (2) a hydrocarbon solution of a trialkyl aluminum compound, such as triisobutyl aluminum; the catalyst desirably further containing a diene compound, such as butadiene or isoprene, and being useful in a process for the rapid polymerization of isoprene in high yield into high molecular weight polymers which can be free from gel.

---

The present invention pertains to the polymerization of isoprene with a view to the obtention of a polyisoprene which essentially has a cis-1,4 structure. More specifically, it concerns the preparation and use of a catalyst which is remarkably effective for the polymerization of isoprene.

A method is known whereby one uses for the polymerization of isoprene and the obtention of a polyisoprene with cis-1,4 chain formation a catalytic system composed of a tetravalent titanium salt, more specifically titanium tetrachloride, and an organo-aluminum compound, such as triisobutyl aluminum, the aluminum/titanium molar ratio in the catalyst ranging from 0.7:1 to 2:1. However, this catalytic system is effective only if one uses a very large quantity of catalyst and, in any case, polymerization is slow, the yield of polyisoprene is low and, above all, the molecular weight of the polyisoprene is low. Thus, the catalytic system and the method are of no practical importance and cannot be expected to furnish a synthetic polyisoprene with properties similar to those of natural rubber, specifically, a high molecular weight, which could be prepared under conditions of industrial use.

Various improvements heretofore have made it possible to ameliorate this catalytic system and to render it usable in industry. In particular, the use of a pre-formed catalyst, instead of a catalyst prepared in situ in the polymerization medium, offers even now a certain improvement of the molecular weight, and possibly also of the rate of polymerization, especially if one eliminates in full or in part the liquid phase of the catalyst which has been preformed and/or if one adds to the catalyst an adjuvant which strengthens its activity. It has also been found that thereby it may be of importance to set the aluminum/titanium molar ratio at a value close to 1, to prepare the catalyst at a low temperature, and to introduce the components forming the catalyst into a solvent in a certain order. However, even if one succeeded in thus obtaining a polyisoprene with characteristics comparable to those of natural rubber, one has not yet found a catalytic system with sufficient effect to result in rapid polymerization of the isoprene, for example, within two hours or less time, while offering a very high rate of conversion, close to 100% and at least in excess of 80%, and furnishing polymers of high molecular weight free from gel.

It is an object of the present invention to overcome this shortcoming and to prepare a highly active catalytic system for the production of a synthetic polyisoprene comparable to natural rubber.

The catalyst in accordance with the invention comprises a mixture of a first solution of a hydrocarbon solvent, such as heptane, containing an ether of the $$R_1\!-\!O\!-\!R_2$$

type wherein $R_1$ and $R_2$ are both aryl radicals, for example, diphenyl ether, and a tetravalent titanium salt, such as titanium tetrachloride or titanium tetrabromide, with a second solution of a hydrocarbon solvent, such as toluene or heptane, containing a trialkyl aluminum compound, such as triisobutyl aluminum or triethyl aluminum.

In accordance with a variant facilitating a further increase of the activity of the catalyst in accordance with the invention, one adds to the catalyst a small quantity of a diene compound, such as butadiene or isoprene, by itself or in a hydrocarbon solution, corresponding to a molar ratio diene/titanium in excess of about 1:1, by preference ranging from about 3:1 to about 10:1. Of course, one could use a larger quantity of diene compound, provided that the catalytic solution or suspension preserves sufficient fluidity to facilitate handling. The diene compound may be introduced before or after any one of the other ingredients. Thereby the catalyst is either in the form of a solution—in case one adds isoprene—or in the form of a fine suspension in a liquid—in case butadiene is added.

The hydrocarbon solution of diaryl ether and tetravalent titanium salt may be prepared in various manners. For example, one may dissolve the diaryl ether in the hydrocarbon solvent, for example heptane, in order to lower, if necessary, the melting point of the diaryl ether, and thereafter introduce into the solution the tetravalent titanium salt. If one thus introduces titanium tetrachloride into a hydrocarbon solution of diphenyl ether, it develops very dark red coloring. One may also prepare the solution by adding the titanium tetrachloride in a hydrocarbon solution to the pure diphenyl ether which has been given a temperature at which it is in liquid state, for example 30° C.

The molar ratio if diaryl ether/titanium must be above about 1:1. The most favorable molar ratio ranges from about 5:1 to about 10:1. There is no noticeable advantage or disadvantage when a molar ratio of 10:1 is exceeded and the activity of the catalyst is not improved beyond a threshold located within the indicated range.

The mixing of the two hyrocarbon solutions is effected in such proportions that the molar ratio of aluminum/titanium ranges from about 0.3:1 to about 1.2:1 and by preference from about 0.6:1 to about 1:1. When one adds the trialkyl aluminum compound solution to the solution of the diaryl ether-titanium salt complex, one obtains an extremely finely divided suspension.

It is preferred that the catalyst be prepared at comparatively low temperature, for example, at a temperature close to 0° C., and that it be left to age for some time, for example, two or three days, even though acceptable results may be obtained if one prepares the catalyst at a higher temperature. However, it is noteworthy that the catalyst preserves its effectiveness in definitely and improves substantially after aging of, for example, at least about one hour.

The degree of dilution in the solvent does not play any significant part and the quantity of solvent may be varied within wide proportions. On the other hand, it is absoluetly necessary that carefully purified solvents are used for preparation of the catalyst. Suitable hydrocarbon solvents include pentane, hexane, heptane, octane, petroleum ether, petrol, cyclohexane, methyl cyclohexane, benzene, toluene, xylene, etc.

As concerns the choice of the diaryl ether, the most common and best indicated compound within the group under consideration is the diphenyl ether, although ditolyl ether and dibenzo-furan can also be used. It has been found that a non-aromatic ether, for example, diethyl ether, does not behave at all in the same manner and does not enable one to prepare an effective catalyst. Likewise, a catalyst prepared by replacing the diaryl ether by a mixed ether, such as phenyl methyl ether (anisole), appears entirely ineffective.

As concerns the trialkyl aluminum compound, the preferred compound is triisobutyl aluminum. However, other trialkyl aluminum compounds, such as tripropyl aluminum, tributyl aluminum, triisohexyl aluminum, trioctyl aluminum, and especially triethyl aluminum, may be used.

The catalysts in accordance with the invention do not require the use of an adjuvant destined to strengthen their action as such action by itself is considerable.

The quantity of catalyst used is defined by the quantity of titanium it contains and useful amounts range from about 1 to about 5 millimoles of titanium per 100 grams of isoprene and, by preference, from about 1 to about 2 millimoles of titanium per 100 grams of isoprene to be polymerized.

Finally, it should be said that the catalysts in accordance with the invention are essentially different from the known catalysts containing a titanium salt together with an aluminum alkyl etherate. In the latter catalysts, the ether is used at an equimolecular proportion with the trialkyl aluminum compound and it combines with the latter compound, while in accordance with the invention, the diaryl ether forms a complex with the titanium salt before it gets into contact with the trialkyl aluminum compound and, moreover, it is introduced in larger quantities. Furthermore, the activity of the catalysts in accordance with the invention has no common denominator with that of the known catalysts.

The invention will be fully understood with the help of the following examples which illustrate it without any limitation.

EXAMPLE 1

Into 30 cc. of carefully purified heptane, one introduces 30 cc. of diphenyl ether (i.e. approximately 32 grams or 189 millimoles), and thereafter 1.23 grams of titanium tetrachloride, i.e. 6.47 millimoles. The diphenyl ether/TiCl₄ molar ratio is approximately 29:1. To this solution one adds thereafter 9.5 cc. of a solution of triisobutyl aluminum in toluene, at the ratio of 0.545 mole/liter, i.e. 5.17 millimoles of trialkyl aluminum compound. Thereby, the molar ratio of aluminum/titanium becomes 0.8:1. One obtains a very fine suspension which constitutes the catalyst and the titanium content of which is approximately 0.1 mole/liter.

One uses varying amounts of this catalyst in an inert atmosphere to polymerize the isoprene in separate stoppered bottles each containing 55 cc. of heptane (40 g.) and 14 cc. of isoprene (10 g.), both of them carefully purified in advance. One introduces a different fraction of the catalytic solution into each bottle and the polymerization reaction is maintained for 2 hours at 55° C. Thereafter, the reaction is arrested and the polyisoprene obtained is recovered, filtered, washed and dried in accordance with the customary techniques and weighed. One obtains the following yields of polyisoprene with a high content of 1,4-cis chains, in relation to the quantity of catalyst:

| Catalyst (in cc.) | Titanium (in millimoles) | Yield (percent) |
| --- | --- | --- |
| 1.5 | 0.15 | 62 |
| 2 | 0.20 | 86 |
| 2.5 | 0.25 | 88 |
| 3 | 0.30 | 96 |
| 3.5 | 0.35 | 100 |
| 4 | 0.40 | 100 |

EXAMPLE 2

In 30 cc. of carefully purified heptane one introduces 20 cc. (126 millimoles) of diphenyl ether, then 0.91 gram of TiCl₄ which is pure (i.e. 0.56 cc., 4.8 millimoles). The solution obtained is cooled to 0° C. whereafter one adds 8.5 cc. of a 0.565 mole/liter solution of triisobutyl aluminum in toluene, i.e., 4.8 millimoles. In the catalyst thus obtained, the Al/Ti molar ratio is thus 1:1.

Operating in the same manner but using smaller quantities of triisobutyl aluminum, one prepares similar catalysts but with Al/Ti molar ratios of 0.9:1, 0.8:1, 0.7:1, and 0.6:1.

One polymerizes with the aforedescribed catalysts as in Example 1, using with the isoprene a catalyst with a concentration of 0.20 millimole of titanium per 10 g. of isoprene. One obtains the following results:

| Catalyst Al/Ti, molar ratio | Yield, percent | Inherent viscosity |
| --- | --- | --- |
| 1.0:1 | 73.3 | 2.68 |
| 0.9:1 | 90.1 | 2.54 |
| 0.8:1 | 82.1 | ¹2.27 |
| 0.7:1 | 82.6 | ¹2.07 |
| 0.6:1 | 70.0 | ¹1.70 |

¹ Plusgel.

The polymers obtained have a gel content which decreases as the Al/Ti molar ratio increases.

It may be seen that the Al/Ti molar ratio exerts a rather appreciable effect on the yield and also on the inherent viscosity.

EXAMPLE 3

Into 30 cc. purified heptane one introduces a variable quantity of diphenyl ether (i.e. 30, 20, 15, 10, 5 and 0 cc. as per test); one adds 0.96 g. of TiCl₄, i.e. 5.05 millimoles and, the solution having been brought to a temperature of 0° C., one adds 6.7 cc. of a 0.580 mole/liter solution of triisobutyl aluminum in toluene, i.e., 3.79 millimoles. The Al/Ti molar ratio thereby becomes 0.77. With the catalyst thus prepared, one polymerizes the isoprene as in Example 1. The polymerization is continued for three hours at 55° C. and the catalyst concentration corresponds to 0.15 and 0.25 millimole titanium respectively, for 10 g. isoprene. The following results are obtained.

| Quantity of diphenyl ether used (cc.) | Quantity of catalyst used per 10 g. of isoprene (mM. of Ti) | Yield (percent) |
| --- | --- | --- |
| 30 | 0.15 | 73.2 |
|    | 0.25 | 87.9 |
| 20 | 0.15 | 67.0 |
|    | 0.25 | 92.2 |
| 15 | 0.15 | 75.6 |
|    | 0.25 | 92.0 |
| 10 | 0.15 | 76.8 |
|    | 0.25 | 92.5 |
| 5  | 0.15 | 60.9 |
|    | 0.25 | 92.8 |
| 0  | 0.15 | 28.9 |
|    | 0.25 | 50   |

It will be noted that the yield does not increase if more than 10 cc. diphenyl ether (63 millimoles) are used, i.e. a molar ratio of diphenyl ether/titanium of about 12. On the other hand, the yield decreases considerably in the absence of diphenyl ether.

EXAMPLE 4

Into 40 cc. of heptane, one introduces 10 cc. of diphenyl ether, 5.15 millimoles of TiCl₄ and 3.87 millimoles of triisobutyl aluminum (Al/Ti=0.75). However, preparation of the catalyst, i.e., the addition of the triisobutyl aluminum, is undertaken at various temperatures, namely 0° C., 20° C. and 40° C. The catalysts are tested for polymerization of isoprene immediately after their preparation and also after two days of aging at room temperature.

One obtains the following results:

| Temperature of preparation of catalyst (° C.) | Quantity of catalyst used for 10 g. isoprene (mM. of Ti) | Yield without aging (percent) | Yield after aging 2 days (percent) |
|---|---|---|---|
| 0 | 0.15 | 40.7 | 51.7 |
|   | 0.25 | 53.9 | 86.8 |
| 20 | 0.15 | 39.3 | 46.2 |
|   | 0.25 | 69.4 | 80.3 |
| 40 | 0.15 | 38.5 | 71.0 |
|   | 0.25 | 68.2 | 78.3 |

It will be noted that it is of advantage to let the catalyst age before use thereof and also to prepare the catalyst at 0° C.

EXAMPLE 5

In the same manner as in the preceding examples one prepares at 0° C. a catalyst from 35 cc. heptane, 10 cc. diphenyl ether, 5.05 millimoles of $TiCl_4$ and 4.04 millimoles of triethyl aluminum.

Polymerization is continued for 2 hours at 60° C. and one obtains the following results:

Quantity of catalyst used
per 10 g. of isoprene
(millimoles of titanium):            Yield, percent
 0.10 _____ 16.5
 0.15 _____ 49
 0.20 _____ 67.5
 0.25 _____ 72.5
 0.30 _____ 78.5

Thus, triethyl aluminum may be used. However, it furnishes less favorable results than triisobutyl aluminum.

EXAMPLE 6

One prepares a catalyst in the manner described above, from the same quantity of reagents (10 cc. diphenyl ether, 5.15 millimoles $TiCl_4$, 4.65 millimoles aluminum triisobutyl), but a variable quantity of heptane solvent or suspension medium.

Carrying on polymerization for three hours at 45° C. one obtains the following results:

| Catalyst prepared in a heptane volume of . . . cc. | Quantity of catalyst used per 10 g. isoprene (in mM. of Ti) | Yield, percent | Inherent viscosity |
|---|---|---|---|
| 10 | 0.15 | 52.8 | 4.03 |
|    | 0.25 | 86.7 | 3.49 |
| 17 | 0.15 | 49.5 | 3.95 |
|    | 0.25 | 87.2 | 3.59 |
| 27 | 0.15 | 49.8 | 3.92 |
|    | 0.25 | 89   | 3.58 |
| 38 | 0.15 | 49.5 | 4.08 |
|    | 0.25 | 88.3 | 3.55 |
| 48 | 0.15 | 51.9 | 3.99 |
|    | 0.25 | 91.1 | 3.65 |

Thus, the dilution of the catalyst does not have any significant influence within the rather wise limits of this test.

One obtains polymers with a viscosity comparable to that of commercial polyisoprenes, sold as products similar to natural rubber (viscosity close to 4) and behaving identically.

EXAMPLE 7

To varying quantities of liquified diphenyl ether (10, 8, 6, 4, 2 and 0 cc.) one adds 20 cc. of a 0.25 mole/liter solution of titanium tetrachloride in heptane. The solutions obtained are cooled to 0° C. and one adds 8.6 cc. of a 0.580 mole/liter solution of triisobutyl aluminum. Therefore, these catalysts all contain 5 millimoles of $TiCl_4$ and 5 millimoles of triisobutyl aluminum.

One uses varying quantities of the various catalysts to polymerize 10 g. of isoprene for two hours at 45° C.
The results obtained are indicated in the following table.

| Quantity of diphenyl ether used (cc.) | Quantity of catalyst used per 10 g. isoprene (in mM. of Ti) | Rate of conversion, percent | Inherent viscosity |
|---|---|---|---|
| 10 | 0.15 | 52.9 | 3.69 |
|    | 0.20 | 78.4 | 3.65 |
|    | 0.25 | 93   | 3.27 |
| 8  | 0.15 | 51.4 | 3.80 |
|    | 0.20 | 79.3 | 3.54 |
|    | 0.25 | 93.7 | 3.49 |
| 6  | 0.15 | 53   | 3.87 |
|    | 0.20 | 80.4 | 3.65 |
|    | 0.25 | 93   | 3.49 |
| 4  | 0.15 | 40.4 | 3.49 |
|    | 0.20 | 70.1 | 3.70 |
|    | 0.25 | 87.5 | 3.62 |
| 2  | 0.15 | 44.7 | 3.26 |
|    | 0.20 | 68.1 | 3.30 |
|    | 0.25 | 84.8 | 3.34 |
| 0  | 0.15 | 12.9 | ---- |
|    | 0.20 | 35.9 | 3.87 |
|    | 0.25 | 48   | 3.88 |

The different manner of operating should be stressed here: the titanium tetrachloride was dissolved in the heptane. before the *pure* diphenyl ether was dissolved therein and not the reverse order of dissolution, as in the preceding examples.

The table above shows (1) that a certain quantity of diphenyl ether is required, in this particular case, 6 cc., i.e. a diphenyl ether/titanium molar ratio of approximately 7.5, in order to obtain the best results;

(2) that above this quantity, one does not obtain any better results;

(3) that below this quantity, the results are worse; and (4) that in the absence of diphenyl ether, the yield is decreased to approximateely one-half.

The effectiveness of the catalyst in accordance with the invention is thus at least double that of the known catalysts.

EXAMPLE 8

Into 44 cc. heptane which has been carefully purified and kept in a nitrogen atmosphere, one introduces 6.24 g. (approximately 6 cc.) diphenyl ether, then 0.58 cc. (1 g., 5.25 millimoles) of $TiCl_4$, and finally 2.4 cc. of isoprene (1.75 g.).

The solution is cooled to −30° C. and one adds 4.5 cc. of a 1.170 mole/ liter solution of triisobutyl aluminum in heptane. One agitates and permits the mixture to return to room temperature. The catalytic solution obtained is dark brown and appears in perfectly homogeneous form. Its viscosity is in no way higher than that of pure heptane.

The molar ratios of the ingredients are:

ether/titanium=5:1
aluminum/titanium=1:1
isoprene/titanium=5:1

This solution is used for the polymerization of isoprene in a nitrogenous atmosphere, within a sealed flask containing 55 cc. heptane (40 g.) and 14 cc. (10 g.) isoprene, both of them carefully purified. One addes a fraction of the catalytic solution and permits the reaction to continue for two hours at 25° C. The viscosity is measured in diluted solution in toluene at 25° C.

The following results are obtained:

| Volume of catalytic solution, cc. | Millimoles of $TiCl_4$ | Rate of conversion, percent | Inherent viscosity |
|---|---|---|---|
| 0.545 | 0.050 | 34.6 | 4.69 |
| 0.82  | 0.075 | 60.5 | 4.67 |
| 1.09  | 0.100 | 79.7 | 4.54 |

It may be seen that the catalyst is more active than it is without any isoprene monomer introduced previously, since it is effective in smaller quantities.

EXAMPLE 9

Into 113 cc. heptane one introduces 12.67 g. of diphenyl ether in a nitrogenous atmosphere, as well as 2 g. $TiCl_4$ (10.5 millimoles) and 2.82 g. butadiene which is pure (52.2 millimoles). The solution is cooled to −20° C. and one adds, while agitating, 8.2 cc. of a 1.28 mole/liter solution of triisobutyl aluminum in heptane. One permits the mixture to return to room temperature and one obtains a solution containing fine solid particles in suspension. The molar ratios are:

diphenyl ether/titanium=7.15:1
aluminum/titantium=1:1
butadiene/titanium=5:1

The $TiCl_4$ content of the solution is 0.0765 mole.

One polymerizes with this solution 10 g. of isoprene dissolved in 30 g. of heptane in a sealed flask, in a nitrogenous atmosphere. After introduction of the heptane solvent and the isoprene monomer, one adds a fraction of the catalytic solution and has the reaction continue for two hours at 25°. The following results are obtained:

| Volume of catalytic solution, cc. | Millimoles of $TiCl_4$ | Rate of conversion, percent | Inherent viscosity |
|---|---|---|---|
| 0.98 | 0.075 | 40 | 5.30 |
| 1.31 | 0.100 | 80 | 5 |

Polymers obtained by coagulation with acetone are free from gel. The rates of conversion are similar to those established by the preceding example. On the other hand, the molecular weights are definitely higher.

What is claimed is:

1. A polymerization catalyst for the polymerization of isoprene consisting essentially of a mixture of (1) a hydrocarbon solution of a complex of a diaryl ether and a tetravalent titanium salt selected from the group consisting of titanium tetrachloride and titanium tetrabromide and (2) a hydrocarbon solution of a triaryl aluminum compound; the molar ratio of diaryl ether to titanium being greater than about 1:1 and the molar ratio of aluminum to titanium being from about 0.3:1 to about 1.2:1; and optionally (3) a diene compound selected from the group consisting of butadiene and isoprene; the molar ratio of diene compound to titanium being greater than about 1:1.

2. The polymerization catalyst as defined by claim 1 wherein the molar ratio of diaryl ether to titanium is from about 5:1 to about 10:1 and the molar ratio of aluminum to titanium is from about 0.6:1 to about 1:1.

3. The polymerization catalyst as defined by claim 1 wherein the molar ratio of diene compound to titanium is from about 3:1 to about 10:1.

4. The polymerization catalyst as defined by claim 2 wherein the diaryl ether is diphenyl ether, the tetravalent titanium salt is titanium tetrachloride and the trialkyl aluminum compound is triisobutyl aluminum.

5. The polymerization catalyst as defined by claim 1 wherein the hydrocarbon solutions (1) and (2) are mixed together at a temperature of about 0° C. and the resultant mixture is aged for at least about one hour.

6. A process for the polymerization of isoprene which comprises maintaining a mixture of isoprene and the polymerization catalyst defined by claim 1 at a temperature from about 25° C. to about 60° C. for from about 1 hour to about 6 hours, the concentration of catalyst expressed in millimoles of titanium per 100 grams of isoprene being from about 1 to about 5.

7. The process defined by claim 6 wherein the temperature is from about 40° C. to about 60° C., the time is from about 2 hours to about 3 hours, and the concentration of catalyst expressed in millimoles of titanium per 100 grams of isoprene is from about 1 to about 2.

References Cited

UNITED STATES PATENTS 3,177,183   4/1965   Naylor et al.   260—82.1

FOREIGN PATENTS 585,210   10/1959   Canada   260—94.3
628,151   9/1961   Canada   260—94.3
880,998   11/1961   Great Britain   260—94.3

JOSEPH L. SCHOFER, Primary Examiner

R. A. GAITHER, Assistant Examiner

U.S. Cl. X.R.

252—429